(12) United States Patent
Salter et al.

(10) Patent No.: US 9,902,318 B1
(45) Date of Patent: Feb. 27, 2018

(54) VEHICLE LIGHTING SYSTEM WITH GRADUAL DIMMING FEATURE

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/493,529

(22) Filed: Apr. 21, 2017

(51) Int. Cl.
| | |
|---|---|
| *B60Q 1/14* | (2006.01) |
| *B60Q 3/18* | (2017.01) |
| *B60Q 3/85* | (2017.01) |
| *B60Q 3/80* | (2017.01) |
| *B60Q 3/14* | (2017.01) |

(52) U.S. Cl.
CPC .................. *B60Q 3/18* (2017.02); *B60Q 3/14* (2017.02); *B60Q 3/80* (2017.02); *B60Q 3/85* (2017.02)

(58) Field of Classification Search
CPC ...................................................... B60Q 3/18
USPC .......... 315/77; 307/10.1, 10.8; 250/552, 554
See application file for complete search history.

(56) References Cited

U.S. PATENT DOCUMENTS

| | | | |
|---|---|---|---|
| 5,473,515 A | * 12/1995 | Liu ...................... | B60Q 1/1423 362/276 |
| 8,519,362 B2 | 8/2013 | Labrot et al. | |
| 2009/0152449 A1 | * 6/2009 | Goto .......................... | G01J 1/02 250/214 R |
| 2012/0212132 A1 | * 8/2012 | Sakaguchi ........... | B60Q 1/1423 315/77 |

FOREIGN PATENT DOCUMENTS

| | | |
|---|---|---|
| CN | 204210396 U | 3/2015 |
| CN | 104966485 A | 10/2015 |
| EP | 1783531 A1 | 5/2007 |
| JP | 2914066 B2 | 6/1999 |
| JP | 3591535 B2 | 11/2004 |
| KR | 101354882 B1 | 1/2014 |

* cited by examiner

*Primary Examiner* — Thuy Vinh Tran
(74) *Attorney, Agent, or Firm* — Jason Rogers

(57) ABSTRACT

A lighting system of a vehicle is provided herein. A light sensor is coupled to a front windshield and is oriented to face in a vehicle-forward direction. A light source is disposed inside the vehicle and a controller is configured to adjust a brightness of the light source based on a light level measured by the light sensor.

19 Claims, 4 Drawing Sheets

VEHICLE LIGHTING SYSTEM WITH GRADUAL DIMMING FEATURE

FIELD OF THE INVENTION

The present invention generally relates to vehicle lighting systems, and more particularly, to vehicle lighting systems employing interior lighting adjusted for daytime and nighttime.

BACKGROUND OF THE INVENTION

Current vehicles typically employ backlighting in either a daytime setting or a nighttime setting. Unfortunately, the nighttime setting fails to account for vision sensitivity with respect to dark adaptation. For example, the human eye may struggle to recover vision sensitivity in the dark following exposure to light. Furthermore, vision sensitivity may differ from one person to the next. As such, instances may arise where the nighttime setting is inadequate to the vision sensitivity of a vehicle driver. Thus, there is a need for a vehicle lighting system that complements the vision sensitivity of the vehicle driver. The present disclosure is intended to satisfy this need.

SUMMARY OF THE INVENTION

According to one aspect of the present invention, a lighting system of a vehicle is provided. A light sensor is coupled to a front windshield and is oriented to face in a vehicle-forward direction. A light source is disposed inside the vehicle and a controller is configured to adjust a brightness of the light source based on a light level measured by the light sensor.

According to another aspect of the present invention, a lighting system of a vehicle is provided. A light sensor is coupled to a front windshield and is configured to measure a light level of an environment forward of the front windshield. A light source is disposed inside the vehicle and a controller is configured to gradually dim the light source from a daytime brightness level to a nighttime brightness level based on the measured light level.

According to yet another aspect of the present invention, a lighting system of a vehicle is provided. A light sensor is disposed at a front windshield location that is in line with a field of vision of a driver of the vehicle. A light source is disposed inside the vehicle and a controller is configured to transition the light source from a daytime brightness level to at least one intermediate brightness level before reaching a nighttime brightness level based on the measured light level.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
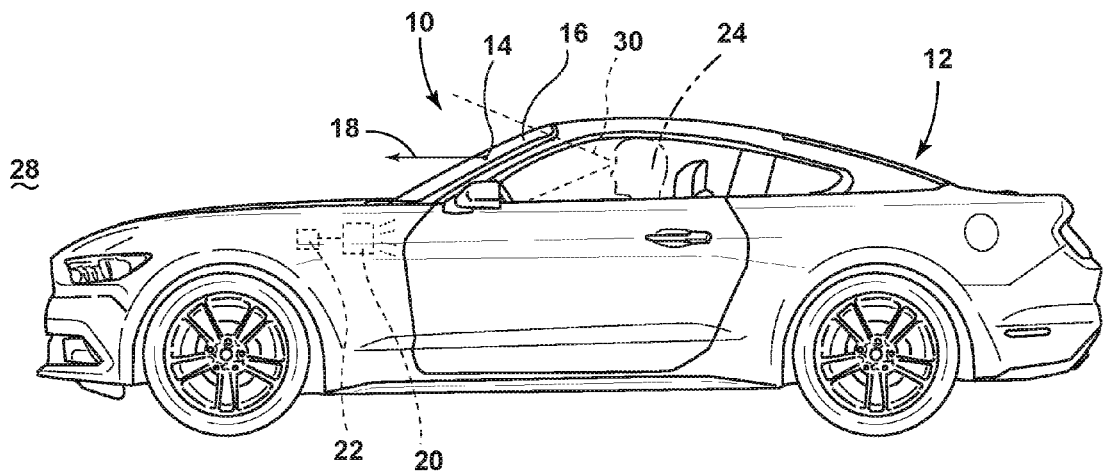
FIG. 1 is a schematic view of a lighting system of a vehicle.
Figure 2:
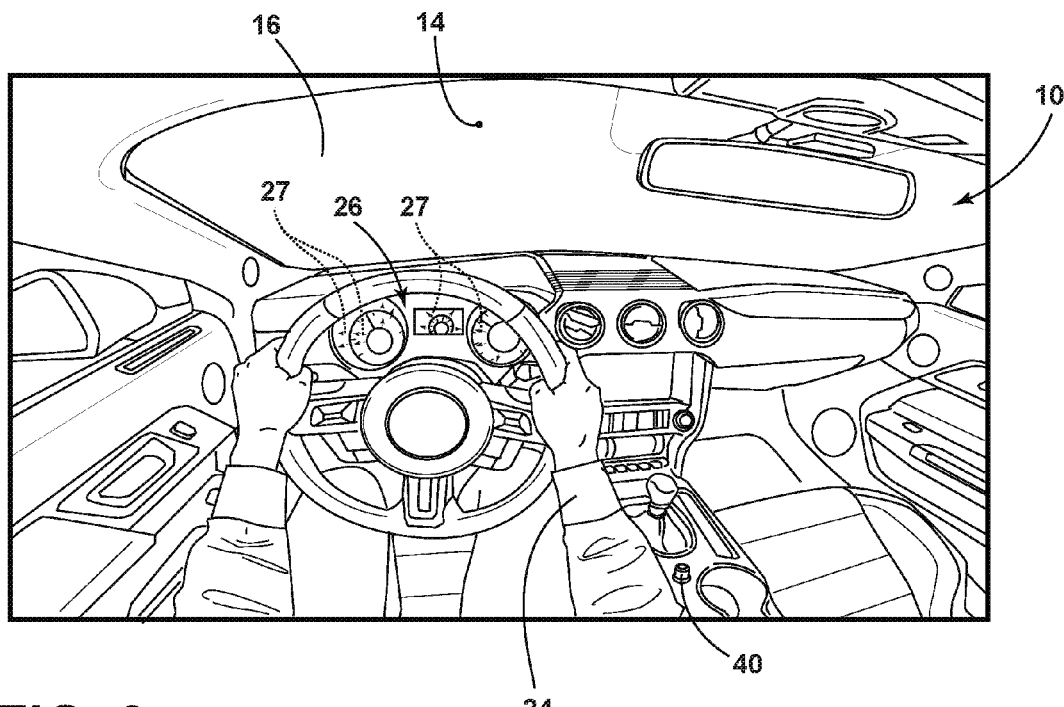
FIG. 2 is a perspective view from the vantage point of a driver of the vehicle.

Referring to FIGS. 1 and 2, a lighting system 10 of a vehicle 12 is shown. The system 10 includes a light sensor 14 coupled to a front windshield 16 of the vehicle 12 and oriented to face in a vehicle-forward direction generally represented by arrow 18. The system 10 also includes a light source 20 disposed inside the vehicle 12 and a controller 22 configured to adjust a brightness of the light source 20 based on a light level measured by the light sensor 14. The light source 20 is located forward of a driver 24 of the vehicle 12 and is configured to backlight a vehicle component 26 that is also located forward of the driver and is exemplarily shown as an instrument cluster. For purposes of illustration, the illumination of the vehicle component 26 by the light source 20 is generally represented by arrows 27 in FIG. 2. The light source 20 may include one or more light-emitting diodes (LEDs) or other known light type(s). Additionally or alternatively, the vehicle component 26 may include a center console, an overhead console and/or any other monitoring or control instrumentation that is typically backlit and utilized by the driver 24. While the light source 20 is described herein as a backlight, it will be appreciated that the light source 20 may additionally or alternatively be configured as direct lighting.

In the depicted embodiment, the light sensor 14 is configured to measure a light level of an environment 28 forward of the front windshield 16. The light sensor 14 is disposed at a front windshield location that is in line with a field of view 30 of the driver 24 of the vehicle 12. By virtue of the location and orientation of the light sensor 14 relative to the driver 24 and associated field of view 30, the light sensor 14 measures the light level in the environment 28 from a similar point of view as the driver 24.

With respect to the embodiments described herein, the light sensor 14 may be packaged so as to prevent the light sensor 14 from obstructing the field of view 30 of the driver 24. In one specific and non-limiting embodiment, the light sensor 14 has a width of 2 mm, a depth of 2 mm, and a height of 0.34 mm. One such light sensor is the APDS-9009, which is manufactured by Avago Technologies. If greater concealment is desired, it is contemplated that the light sensor 14 may be located at portions of the front windshield 16 that are tinted and/or fritted, if available, for example.

Figure 3:
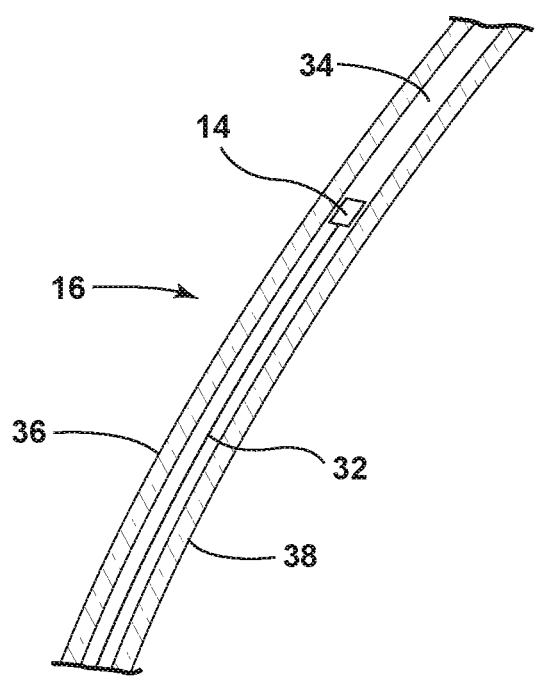
FIG. 3 is a sectional view of a front windshield of the vehicle, the front windshield housing a light sensor and an electrical conductor.

Referring to FIG. 3, the light sensor 14 is operably coupled to the controller 22 via a transparent electrical conductor 32 coupled to the front windshield 16. Both the light sensor 14 and the electrical conductor 32 may be integrated in the front windshield 16 or otherwise assembled thereto. While the electrical conductor 32 is shown extending downwardly within the front windshield 16, it should be appreciated that the electrical conductor 32 may otherwise extend upwardly, sideways, or in any other direction, and may be coupled to the controller 22 through a direct or indirect electrical connection. The electrical conductor 32 may include a transparent conductive oxide (TCO) material such as, but not limited to, indium tin oxide (ITO) or indium oxide. By using an ITO material, the electrical conductor 32 is generally concealed from the driver 24. In alternative embodiments, a copper wire having a thickness of 0.004 inches, for example, may be used as the electrical conductor 32.

In the depicted embodiment, the light sensor 14 and the electrical conductor 32 are disposed in an interlayer 34 between an exterior glass element 36 and an interior glass element 38. The interlayer 34 may include one or more layers of polyvinyl butyral (PVB) or other material commonly used in windshield construction. In some embodiments, the interlayer 34 may be configured as a dampener that prevents sound frequencies from vibrating between the exterior and interior glass elements 36, 38. For example, the interlayer 34 may include one or more layers of acoustic PVB.

Referring back to FIGS. 1 and 2, the system 10 may include a user-input device 40 for controlling an output of the light source 20. For example, the user-input device 40 is shown as a rotatable knob accessible by the driver 24. By manipulating (e.g., turning and/or depressing) the knob, the driver may perform a variety of controls related to the output of the light source 20. Such controls may include, but are not limited to, turning the light source 20 ON/OFF, adjusting the brightness of the light source 20, and specifying a dimming curve or rate of the light source 20. In other embodiments, the user-input device 40 may additionally or alternatively include other instrumentation located in the vehicle cabin and generally accessible by the driver 24 or other vehicle occupant. For example, the user-input device 40 may correspond to a touchscreen display of the center console. By providing the user-input device 40, the driver 24 is given the option to control the output of the light source 20 based on the sensitivity of his or her eyes to light, or a lack thereof.

Figure 4:
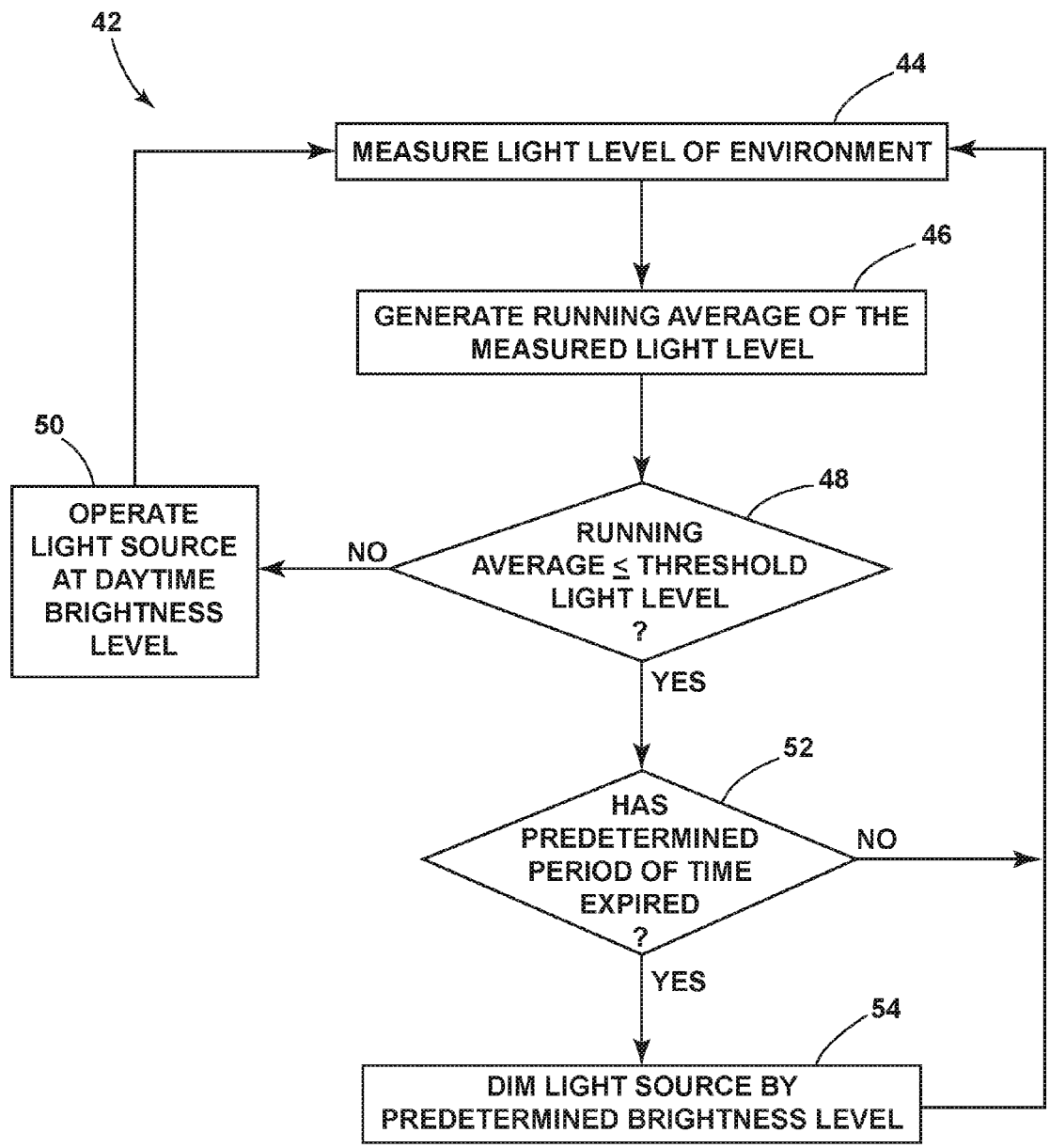
FIG. 4 is a flow diagram of a lighting method implemented by the lighting system shown in FIGS. 1 and 2.

Referring to FIG. 4, a lighting method 42 is shown for controlling the output of the light source 20 and is exemplarily described herein as being implemented by the system 10 shown in FIGS. 1 and 2. At step 44, the light sensor 14 measures the light level of the environment 28. At step 46, a running average of the measured light level is generated. In one embodiment, the light sensor 14 is configured to periodically measure the light level at a predetermined time interval and the running average is generated by the controller 22 using a predetermined number of light level measurements. For example, the light sensor 14 may measure the light level twice per second and the controller 22 may generate the running average using the last twenty light level measurements. At step 48, the running average is compared to a threshold light level, which may correspond to a dimming trigger level set at the factory and/or specified using the user-input device 40.

If the threshold condition of step 48 is not satisfied (i.e., the running average is greater than the threshold light level), the controller 22 operates the light source 20 at a daytime brightness level at step 50 before returning to step 44. The daytime brightness level may be set at the factory and/or specified using the user-input device 40. Otherwise, if the threshold condition is satisfied (i.e., the running average is less than or equal to the threshold light level), the controller 22 determines whether or not a predetermined period of time has expired at step 52. If not, the controller 22 returns to step 44. Otherwise, if the predetermined period of time has elapsed, the controller 22 dims the light source 20 by a predetermined brightness level at step 54 before returning to step 44. Accordingly, so long as the conditions specified in steps 48 and 52 are satisfied, the controller 22 gradually dims the light source 20 until a nighttime brightness level is reached. The nighttime brightness level may be set at the factory and/or specified using the user-input device 40.

Figure 5:
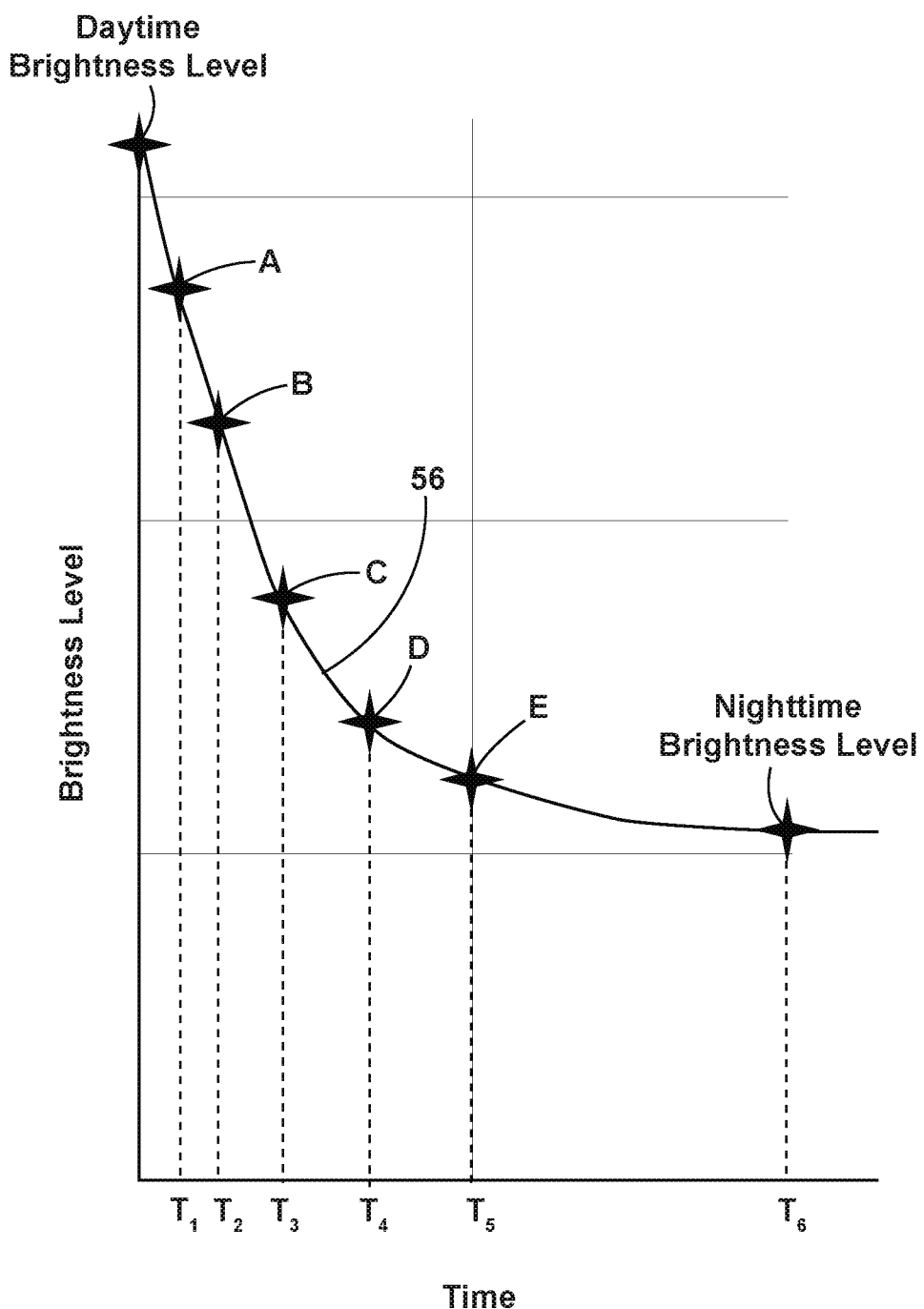
FIG. 5 illustrates one exemplary dimming curve for a light source of the lighting system.

Referring to FIG. 5, the controller 22 is configured to gradually dim the light source 20 from the daytime brightness level to the nighttime brightness level based on dimming curve 56. According to one embodiment, the dimming curve 56 is based on a recovery of vision sensitivity in the dark following exposure to light. As shown, the dimming curve 56 has a plurality of brightness levels that include the daytime brightness level, the nighttime brightness level, and one or more intermediate brightness levels A-E between the daytime brightness level and the nighttime brightness level. However, more or less intermediate brightness levels may be utilized in other embodiments and/or specified using the user-input device 40.

In the depicted embodiment, a current brightness level transitions to a next brightness level after the expiration of a predetermined period of time. For example, if the light source 20 is operating at the daytime brightness level and the conditions specified in steps 48 and 52 are satisfied, a period of time $T_1$ expires before the daytime brightness level transitions to intermediate brightness level A. So long as the conditions specified in steps 48 and 52 continue to be satisfied, the expiration of a period of time $T_2-T_1$ leads to intermediate brightness level A transitioning to intermediate brightness level B, and so on, until the nighttime brightness level is reached. The light source 20 may be continuously operated at the nighttime brightness level until the measured light level, running average or otherwise, exceeds the threshold light level, at which point the controller 22 operates the light source 20 at the daytime brightness level.

It will be appreciated that the total dimming time $T_6$ in which the light source 20 is dimmed from the daytime brightness to the nighttime brightness may be in the order of seconds, minutes, or even hours. The total dimming time $T_6$ may be set at the factory and/or specified using the user-input device 40. As depicted, consecutive brightness levels are separated by a period of time that is variable and the dimming curve decays exponentially. For example, the period of time separating any consecutive brightness levels generally increases as the dimming curve 56 approaches the nighttime brightness level. In alternative embodiments, the period of time separating consecutive brightness levels may be decreasing or constant and/or the dimming curve 56 may decay linearly. It is further contemplated that the controller 22 may be configured to dim the light source 20 based on a dimming curve selected from a plurality of preset dimming curves using the user-input device 40. In this manner, the driver 24 or other user may select a dimming curve that best matches his or her recovery of vision sensitivity in the dark following exposure to light.

Accordingly, a lighting system of a vehicle has been advantageously provided herein. In one embodiment, the lighting system includes a light sensor coupled to a front windshield and oriented to face in a vehicle-forward direction. A light source is disposed inside the vehicle and a controller is configured to adjust a brightness of the light source based on a light level measured by the light sensor.

Embodiments of lighting system may include any one or a combination of the following features:
- the light sensor is electrically coupled to the controller via a transparent electrical conductor coupled to the front windshield;
- the light sensor is disposed at a front windshield location that is in line with a field of vision of a driver of the vehicle;
- the light sensor is configured to measure a light level of an environment forward of the front windshield;
- the light source is configured to backlight a vehicle component located in a front passenger compartment of the vehicle;
- the controller is configured to gradually dim the light source based on a running average of the measured light level being equal to or less than a threshold light level and the expiration of a predetermined period of time;
- the controller is configured to gradually dim the light source from a daytime brightness level to a nighttime brightness level based on the measured light level;
- the controller is configured to transition the light source from a daytime brightness level to at least one intermediate brightness level before reaching a nighttime brightness level based on the measured light level;
- the controller is configured to gradually dim the light source based on a dimming curve having a plurality of brightness levels comprising the daytime brightness level, the nighttime brightness level, and the at least one intermediate brightness level;
- a period of time separating any consecutive brightness levels increases as the dimming curve approaches the nighttime brightness level;
- the dimming curve decays exponentially or linearly;
- a user-input device configured to allow a user to adjust the dimming curve;
- a user-input device configured to allow a user to select the dimming curve from a plurality of dimming curves; and/or
- a user-input device configured to allow a user to adjust an output of the light source.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this detailed description.

What is claimed is:

1. A lighting system of a vehicle, comprising:
   a light sensor coupled to a front windshield and oriented to face in a vehicle-forward direction;

a light source disposed inside the vehicle; and a controller configured to adjust a brightness of the light source based on a light level measured by the light sensor, wherein the light sensor is electrically coupled to the controller via a transparent electrical conductor coupled to the front windshield.

2. The lighting system of claim 1, wherein the light sensor is disposed at a front windshield location that is in line with a field of vision of a driver of the vehicle.

3. The lighting system of claim 1, wherein the light source is configured to backlight a vehicle component located in a front passenger compartment of the vehicle.

4. The lighting system of claim 1, wherein the controller is configured to gradually dim the light source based on a running average of the measured light level being equal to or less than a threshold light level and the expiration of a predetermined period of time.

5. The lighting system of claim 1, wherein the controller is configured to gradually dim the light source based on a dimming curve having a plurality of brightness levels comprising a daytime brightness level, a nighttime brightness level, and one or more intermediate brightness levels therebetween.

6. The lighting system of claim 1, further comprising a user-input device configured to allow a user to adjust an output of the light source.

7. A lighting system of a vehicle, comprising:

a light sensor coupled to a front windshield and configured to measure a light level of an environment forward of the front windshield;

a light source disposed inside the vehicle; and a controller configured to gradually dim the light source from a daytime brightness level to a nighttime brightness level based on the measured light level.

8. The lighting system of claim 7, wherein the light sensor is electrically coupled to the controller via a transparent electrical conductor coupled to the front windshield.

9. The lighting system of claim 7, wherein the light sensor is disposed at a front windshield location that is in line with a field of vision of a driver of the vehicle.

10. The lighting system of claim 7, wherein the light source is configured to backlight a vehicle component located in a front passenger compartment of the vehicle.

11. The lighting system of claim 7, wherein the controller is configured to gradually dim the light source based on a dimming curve having a plurality of brightness levels comprising the daytime brightness level, the nighttime brightness level, and one or more intermediate brightness levels therebetween.

12. The lighting system of claim 11, further comprising a user-input device configured to allow a user to select the dimming curve from a plurality of dimming curves.

13. A lighting system of a vehicle, comprising:

a light sensor disposed at a front windshield location that is in line with a field of vision of a driver of the vehicle;

a light source disposed inside the vehicle; and a controller configured to transition the light source from a daytime brightness level to at least one intermediate brightness level before reaching a nighttime brightness level based on the measured light level.

14. The lighting system of claim 13, wherein the light sensor is electrically coupled to the controller via a transparent electrical conductor coupled to the front windshield.

15. The lighting system of claim 13, wherein the light source is configured to backlight a vehicle component located in a front passenger compartment of the vehicle.

16. The lighting system of claim 13, wherein the controller is configured to gradually dim the light source based on a dimming curve having a plurality of brightness levels comprising the daytime brightness level, the nighttime brightness level, and the at least one intermediate brightness level.

17. The lighting system of claim 16, wherein a period of time separating any consecutive brightness levels increases as the dimming curve approaches the nighttime brightness level.

18. The lighting system of claim 16, wherein the dimming curve decays exponentially or linearly.

19. The lighting system of claim 13, further comprising a user-input device configured to allow a user to adjust the dimming curve.

* * * * *